United States Patent
Kim et al.

(10) Patent No.: US 10,469,226 B2
(45) Date of Patent: Nov. 5, 2019

(54) METHOD FOR TRANSMITTING AND RECEIVING POSITIONING REFERENCE SIGNAL IN WIRELESS COMMUNICATION SYSTEM AND DEVICE THEREFOR

(71) Applicant: IUCF-HYU (INDUSTRY-UNIVERSITY COOPERATION FOUNDATION HANYANG UNIVERSITY), Seoul (KR)

(72) Inventors: Sun Woo Kim, Seoul (KR); Jaehoon Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 15/765,798

(22) PCT Filed: Oct. 5, 2016

(86) PCT No.: PCT/KR2016/011150
§ 371 (c)(1),
(2) Date: Apr. 4, 2018

(87) PCT Pub. No.: WO2017/061774
PCT Pub. Date: Apr. 13, 2017

(65) Prior Publication Data
US 2018/0294934 A1    Oct. 11, 2018

(30) Foreign Application Priority Data

Oct. 5, 2015    (KR) .................. 10-2015-0139782
Oct. 5, 2016    (KR) .................. 10-2016-0128479

(51) Int. Cl.
  H04L 5/00        (2006.01)
  H04W 64/00       (2009.01)
  (Continued)

(52) U.S. Cl.
  CPC .............. *H04L 5/0048* (2013.01); *G01S 1/20* (2013.01); *G01S 5/0236* (2013.01); *G01S 5/10* (2013.01);
  (Continued)

(58) Field of Classification Search
  CPC ... H04L 5/0048; H04L 5/0007; H04L 5/0053; H04L 5/0051; H04L 5/0055;
  (Continued)

(56) References Cited

U.S. PATENT DOCUMENTS

2010/0317343 A1* 12/2010 Krishnamurthy ......... G01S 1/30
                                                         455/435.1
2011/0039574 A1*  2/2011 Charbit ................. G01S 5/0215
                                                         455/456.1
(Continued)

FOREIGN PATENT DOCUMENTS

KR    10-2009-0119987 A    11/2009
KR    10-2012-0046217 A     5/2012
(Continued)

OTHER PUBLICATIONS

International Search Report for PCT/KR2016/011150 dated Jan. 17, 2017 [PCT/ISA/210].

*Primary Examiner* — Nimesh Patel
(74) *Attorney, Agent, or Firm* — Sughrue Mion, PLLC

(57) ABSTRACT

The present invention relates to a method for transmitting and receiving a positioning reference signal (PRS) in a wireless communication system. More specifically, the present invention relates to a detailed method and device for setting a transmission pattern for the PRS. Provided in one (Continued)

embodiment is a method by which a terminal receives the PRS, and a terminal device, the method comprising the steps of: monitoring the PRS in one PRS monitoring section; receiving the PRS in one or more consecutive subframes included in the one PRS monitoring section; and transmitting, to a base station, information for a position measurement by using reception time information of the PRS, wherein a resource element allocation pattern of the PRS is determined by a random number.

12 Claims, 12 Drawing Sheets

(51) Int. Cl.
    *G01S 5/10*     (2006.01)
    *H04W 24/10*     (2009.01)
    *H04W 4/021*     (2018.01)
    *G01S 1/20*     (2006.01)
    *G01S 5/02*     (2010.01)

(52) U.S. Cl.
    CPC ............ *H04L 5/005* (2013.01); *H04L 5/0053* (2013.01); *H04W 4/022* (2013.01); *H04W 24/10* (2013.01); *H04W 64/003* (2013.01)

(58) Field of Classification Search
CPC ... H04L 5/0057; H04L 5/005; H04L 27/2613; H04L 5/0073; H04L 5/0098; H04L 25/0216; H04L 5/0092; H04L 27/261; H04L 5/0035; H04W 16/14; H04W 16/28; H04W 64/00; H04W 4/02; H04W 4/029; H04W 4/33; H04W 4/025; H04W 4/90; H04W 64/006; H04W 76/50; H04W 84/042; H04W 16/24; H04W 16/26; H04W 40/244; H04W 64/003; H04W 88/02; H04W 72/005; H04W 72/048; H04W 8/183; H04W 36/30; H04W 84/12; H04W 28/08; H04W 36/32; H04W 16/18; H04W 28/16; H04W 28/0226; H04W 36/0072; H04W 72/12; H04W 84/045; H04W 8/205; G01S 5/10; H04B 7/0617; H04B 7/0626; H04B 17/27; H04B 17/318; H04B 7/0413

See application file for complete search history.

(56) References Cited

U.S. PATENT DOCUMENTS

| | | | | |
|---|---|---|---|---|
| 2012/0165053 | A1* | 6/2012 | Yoon | H04L 5/0048 455/501 |
| 2012/0270572 | A1* | 10/2012 | Siomina | G01S 5/0236 455/456.6 |
| 2013/0267246 | A1* | 10/2013 | Wang | H04W 24/10 455/456.1 |
| 2014/0094188 | A1* | 4/2014 | Kazmi | G01S 5/0242 455/456.1 |
| 2015/0304994 | A1* | 10/2015 | Kim | H04L 5/0048 370/280 |
| 2015/0365218 | A1* | 12/2015 | Yang | H04L 5/0044 370/329 |
| 2017/0288830 | A1* | 10/2017 | Fischer | G01S 5/0226 |
| 2017/0318554 | A1* | 11/2017 | Kim | G01S 5/0236 |

FOREIGN PATENT DOCUMENTS

| | | |
|---|---|---|
| KR | 10-2012-0082717 A | 7/2012 |
| KR | 10-2012-0093026 A | 8/2012 |
| KR | 10-2014-0138617 A | 12/2014 |

\* cited by examiner

METHOD FOR TRANSMITTING AND RECEIVING POSITIONING REFERENCE SIGNAL IN WIRELESS COMMUNICATION SYSTEM AND DEVICE THEREFOR

TECHNICAL FIELD

The present disclosure relates to a method of transmitting and receiving a Positioning Reference Signal (PRS) in a wireless communication system. More particularly, the present disclosure relates to a detailed method and apparatus for configuring a transmission pattern for a PRS.

BACKGROUND ART

The geographical location of a User Equipment (UE) is basically calculated by measuring the delay time of signals transmitted from a plurality of cells. Accordingly, in order to measure the location of the UE, at least three signals are required. Based thereon, various methods of calculating the location of the UE exist but, in general, an Observed Time Difference Of Arrival (OTDOA) scheme is mainly used.

FIG. 1 is a conceptual diagram illustrating an OTDOA scheme for measuring a UE location.

Referring to FIG. 1, the OTDOA scheme is for measuring, by a UE, the location of the UE based on a difference in times at which signals transmitted from respective cells reach the UE, and the UE measures delay times of the signals received from the respective cells and reports the measured delay time to a serving cell or an anchor cell, and the serving cell measures the location of the corresponding UE based on the reported delay times.

In this case, various reference signals for a location-based service may be used for the signals transmitted to the UE from the respective cells. For example, a Positioning Reference Signal (PRS) may be used.

In this case, the UE may use PRSs received from the respective cells and determine the location based on an arrival time difference between the received PRSs. Alternatively, the UE may transmit information on the arrival time difference between the PRSs to the serving cell or the anchor cell, and thus the serving cell or the anchor cell may determine the location of the UE.

Meanwhile, in receiving the PRSs received from a plurality of cells, which are used for determining the location, the UE may need to distinguish PRSs of respective cells. Further, the PRSs transmitted from the respective cells are required to minimize interference of adjacent cells. That is, PRSs transmitted from cells having different cell IDs should have the low side lobe of auto correlation.

To this end, with respect to PRSs of adjacent cells transmitted for determining the location of one UE, it is required to set time-frequency patterns differently. However, the number of time-frequency patterns for the PRSs is limited by a communication system, and thus it is difficult to generate a large number of time-frequency patterns having excellent correlation attributes. That is, when a large number of PRS patterns is configured and used with limited resources, redundant Resource Elements (REs) between various patterns are overlappingly used, so that a large number of "hits" exists.

Meanwhile, according to the development of services based on a disaster situation and an accurate location of a user, a technology for accurately measuring the location of a user UE is needed. Further, many Base Station (BS) infrastructure elements such as small cells for providing a communication service in an environment in which users are concentrated are constructed.

In such a situation, research on various PRS patterns or PRS expansion for minimizing interference has been conducted according to an increase in the number of adjacent cells.

DETAILED DESCRIPTION OF THE INVENTION

Technical Problem

An embodiment proposed in the above-described background provides a detailed method and apparatus using PRSs in extended time or frequency space.

Further, an embodiment provides a PRS transmission method and apparatus for minimizing PRS interference between adjacent cells by transmitting PRS patterns in various combinations.

Technical Solution

An embodiment to solve the technical problem provides a method of receiving a positioning reference signal by a User Equipment (UE). The method includes: a step of monitoring positioning reference signals in one positioning reference signal monitoring section; a step of receiving positioning reference signals in one or more successive subframes included in the one positioning reference signal monitoring section; and a step of transmitting information for measuring a location based on reception time information of the positioning reference signals to a Base Station (BS), wherein resource element allocation patterns of the positioning reference signals are determined based on a random number.

Further, an embodiment provides a method of transmitting a positioning reference signal by a Base Station (BS). The method includes: a step of determining resource element allocation patterns of positioning reference signals using a random number; and a step of transmitting the positioning reference signals using the resource element allocation patterns in one or more successive subframes included in one positioning reference signal monitoring section.

In addition, an embodiment provides a User Equipment (UE) for receiving a positioning reference signal. The UE includes: a controller configured to monitor positioning reference signals in one positioning reference signal monitoring section; a receiver configured to receive positioning reference signals in one or more successive subframes included in the one positioning reference signal monitoring section; and a transmitter configured to transmit information for measuring a location based on reception time information of the positioning reference signals to a Base Station (BS), wherein resource element allocation patterns of the positioning reference signals are determined using a random number.

Advantageous Effects

An embodiment provides an effect of efficiently operating a system through an increased PRS reuse rate by using PRSs in expanded time or frequency space.

Further, an embodiment provides an effect of increasing accuracy of measurement of the UE location by preventing redundancy of PRS patterns even in an environment in which a plurality of small cells is disposed by minimizing PRS interference between adjacent cells.

MODE FOR CARRYING OUT THE INVENTION

Figure 1:
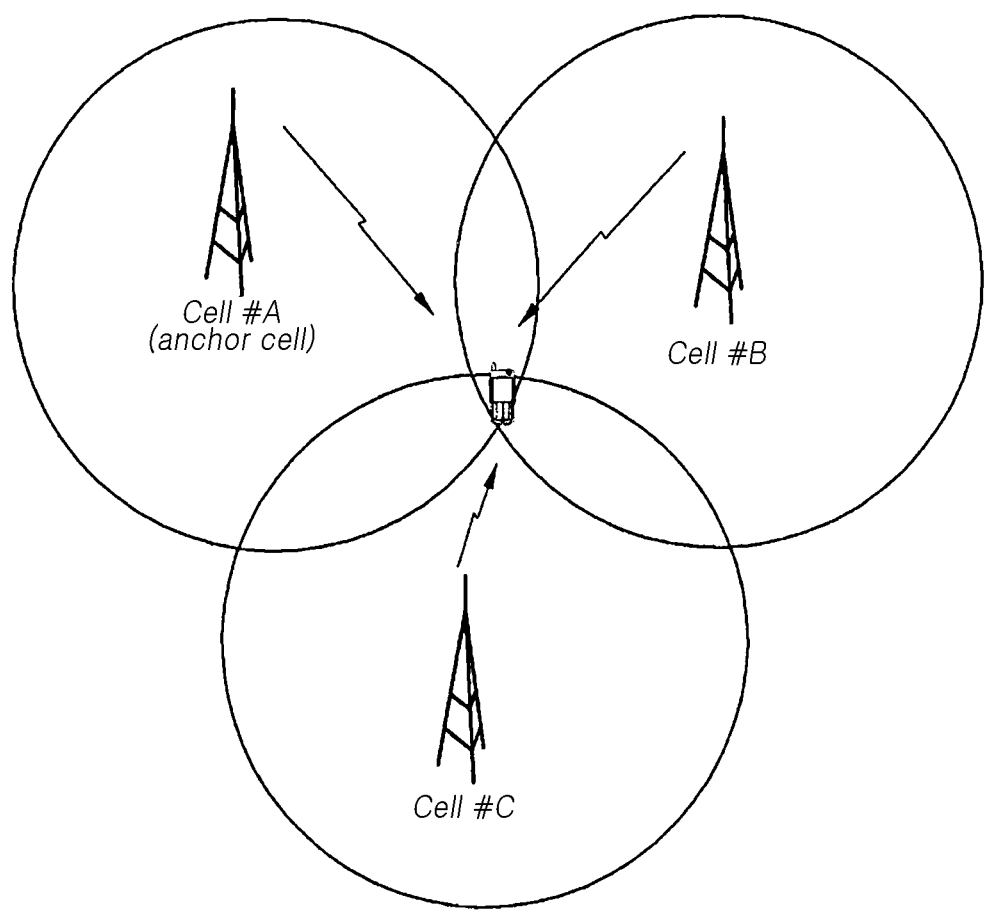
FIG. 1 is a conceptual diagram illustrating an OTDOA scheme for measuring a UE location.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, an MTC terminal may refer to a terminal that supports low cost (or low complexity), a terminal that supports coverage enhancement, or the like. In the present specifications, the MTC terminal may refer to a terminal that supports low cost (or low complexity) and coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell, and thus, the base station may be construed in two ways. i) The base station may be a device itself that provides a mega cell, a macro cell, a micro cell, a pico cell, a femto cell, and a small cell in association with a wireless area, or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an RRH, an antenna, an RU, a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a mega cell, a macro cell, a micro cell, a pico cell, a femto cell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In this specification, a cell may refer to a component carrier, which has the coverage of a signal transmitted by a transmission/reception point or that of a signal transmitted by a transmission point or the transmission/reception point, and the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multiple transmission/reception points to a UE, and an uplink refers to communication or a communication path from a UE to multiple transmission/reception points. In a downlink, a transmitter may be a part of a multi-transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

The present disclosure relates to wireless communication, and more particularly to a method and an apparatus for transmitting a positioning reference signal in a wireless communication system.

Figure 2:
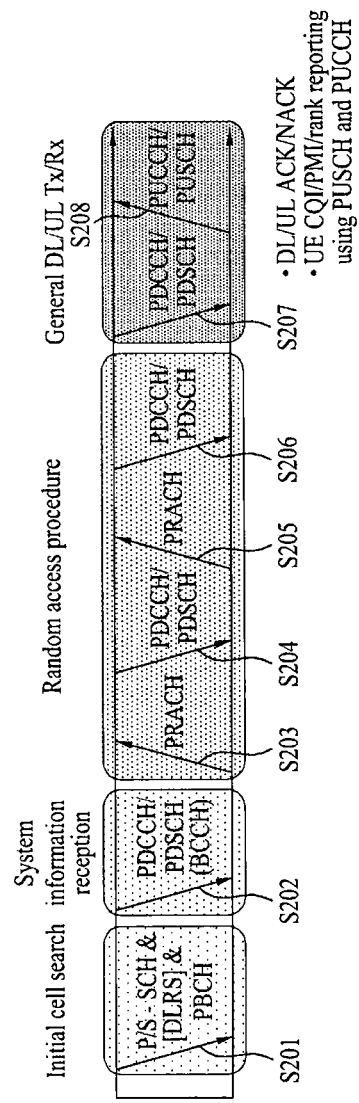
FIG. 2 illustrates physical channels used in a 3rd-Generation Partnership Project (3GPP) Long-Term Evolution (LTE) system, which is an example of mobile communication systems, and a general signal transmission method using the physical channels.

FIG. 2 illustrates physical channels used in a 3rd-Generation Partnership Project (3GPP) Long-Term Evolution (LTE) system, which is an example of a mobile communication system, and a general signal transmission method using the physical channels.

A UE of which power is turned on from an off state or which newly enters a cell performs an initial cell search operation of synchronizing with a BS in step S201. To this end, the UE may receive a Primary Synchronization Channel (P-SCH) and a Secondary Synchronization Channel (S-SCH) from the BS, synchronize with the BS, and acquire information such as a cell ID. Thereafter, the UE may receive a physical broadcast channel from the BS and acquire broadcasting information within the cell. Meanwhile, the UE may receive a Downlink Reference Signal (DRS) to identify a downlink channel state in an initial cell search step.

The UE that finishes the initial cell search may receive a Physical Downlink Control Channel (PDCCH) and a Physical Downlink Shared Channel (PDSCH) according to information on the PDCCH to acquire more detailed system information in step S202.

Meanwhile, when the UE initially access the BS or has no radio resources for signal transmission, the UE may perform a random access procedure of accessing the BS like steps S203 to step S206. To this end, the UE may transmit a feature sequence as a preamble through a Physical Random Access Channel (PRACH) in S203 and receive a response message for the random access through the PDCCH and the PDSCH corresponding to the PDCCH in S204. In the case of contention-based random access other than handover, a contention resolution procedure such as subsequent transmission S205 of an additional physical random access channel and reception S206 of the PDCCH/PDSCH may be performed.

Thereafter, as a general uplink/downlink signal transmission procedure, the UE having performed the above-described procedure may perform reception S207 of the PDCCH/PDSCH and transmission S208 of a Physical Uplink Shared Channel (PUSCH)/Physical Uplink Control Channel (PUCCH). At this time, control information, which the UE transmits to the BS or receives from the BS through uplink, includes a downlink/uplink ACK/NACK signal and a Channel Quality Indicator (CQI)/Precoding Matrix Index (PMI)/Rank Indicator (RI). In the 3rd Generation Partnership Project (3GPP) Long Term Evolution (LTE) system, the UE may transmit the control information such as CQI/PMI/RI through the PUSCH and/or PUCCH.

In the 3GPP LTE system, a signal-processing process for transmitting a downlink signal by the BS will be described below.

Figure 3:
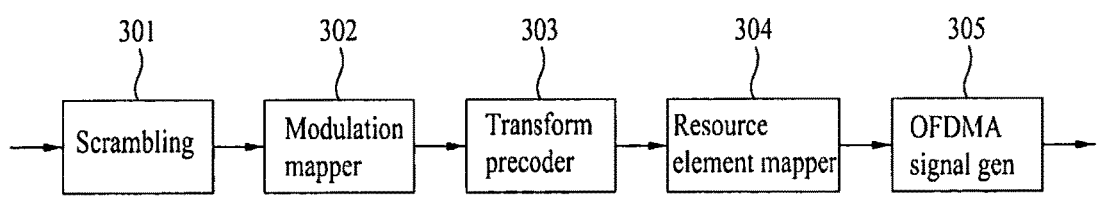
FIG. 3 illustrates a signal-processing process for transmitting a downlink signal by the BS.

FIG. 3 illustrates a signal-processing process for transmitting a downlink signal by the BS.

In the 3GPP LTE system, the BS may transmit one or more code words through downlink. Accordingly, one or more code words may be processed as complex symbols through a scrambling module 301 and a modulation mapper 302. Thereafter, the complex symbols may be mapped to a plurality of layers by a layer mapper 303, and each layer may be multiplied by a predetermined precoding matrix selected according to a channel state by a precoding module 304 and allocated to each transmission antenna. The processed transmission signal for each antenna may be mapped to a time-frequency resource element to be used for transmission by a resource element mapper 305, and may then be transmitted through each antenna via an OFDM signal generator 306.

Meanwhile, in an LTE or LTE-Advanced system, one frame includes 10 subframes and one subframe includes 2 slots. A time duration for transmission of one subframe is referred to as a Transmission Time Interval (hereinafter, referred to as a "TTI"). For example, one subframe may be 1 ms, and one slot may be 0.5 ms. One slot includes a plurality of Orthogonal Frequency Division Multiplexing (OFDM) symbols. The OFDM symbol may be called an SCFDMA symbol or a symbol period. One slot includes 7 or 6 OFDM symbols depending on the length of a Cyclic Prefix (hereinafter, referred to as a "CP"). In the LTE system, there are a normal CP and an extended CP. One slot includes 7 OFDM symbols when the normal CP is used, and one slot includes 6 OFDM symbols when the extended CP is used. The extended CP is used when a delay spread is great.

Figure 4:
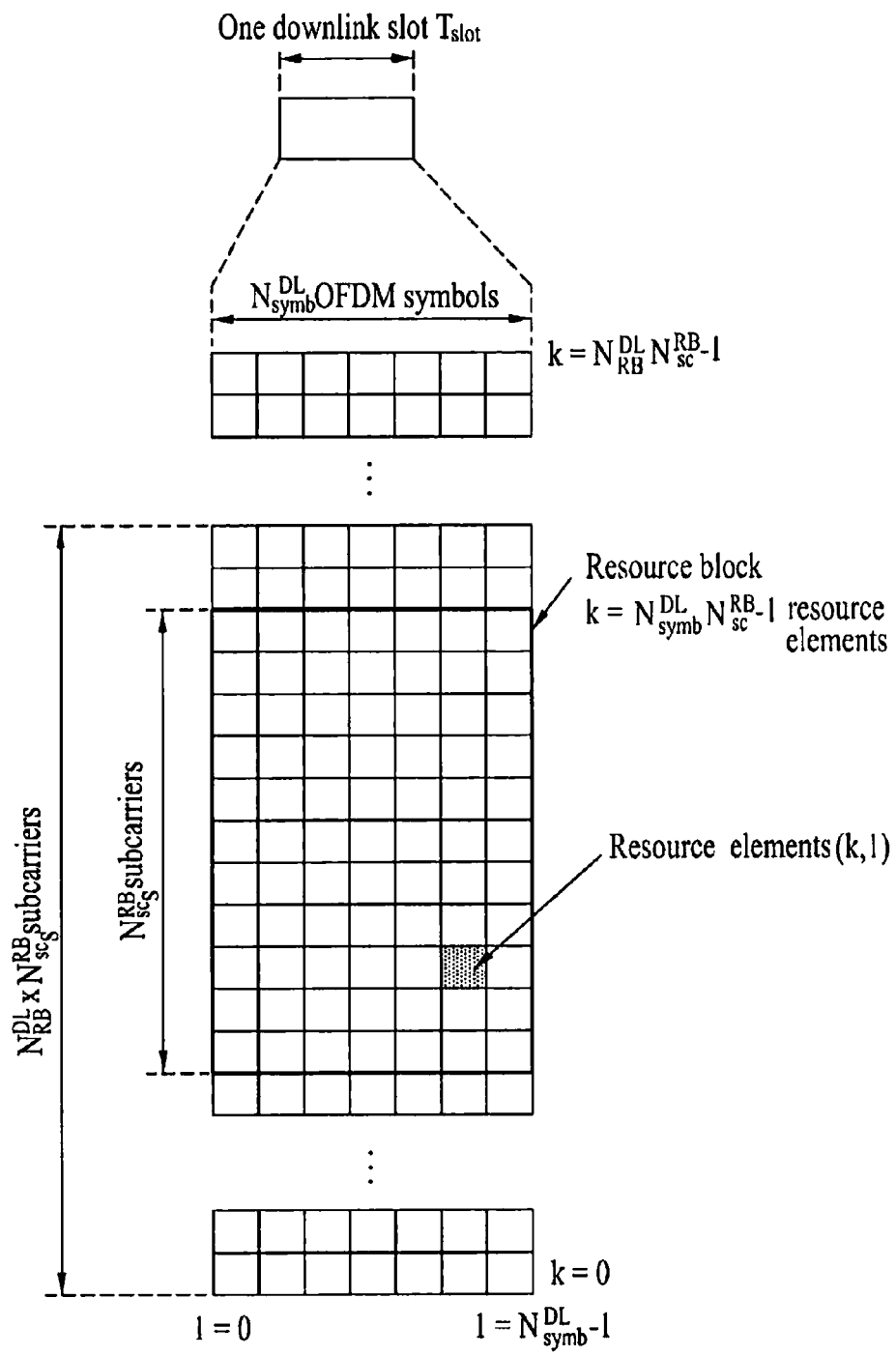
FIG. 4 illustrates a slot structure in the LTE system.

FIG. 4 illustrates a slot structure of the LTE system.

As illustrated in FIG. 4, a signal transmitted in each slot may be described by a resource grid including $N_{RB}^{DL} N_{SC}^{DL}$ subcarriers and $N_{symb}^{DL}$ Orthogonal Frequency Division Multiplexing (OFDM) symbols. Here, $N_{RB}^{DL}$ denotes the number of Resource Blocks (RBs), $N_{SC}^{DL}$ denotes the number of subcarriers forming one RB, and $N_{symb}^{DL}$ denotes the number of OFDM symbol of one slot.

Meanwhile, need for methods of determining the location of the UE has increased due to the recent use of various real-world applications. Among the methods of determining the location of the UE, widely known methods may be largely divided into a GPS (Global Positioning System)-based scheme and a terrestrial-positioning-based scheme.

The GPS-based scheme measures the location of a user device using satellites and requires reception signals from at least four satellites. The GPS-based scheme has a disadvantage in that it cannot be used in an indoor environment.

Meanwhile, the terrestrial-positioning-based scheme measures the location of the UE using a timing difference between signals transmitted from BSs and requires reception signals from at least three BSs. The terrestrial-positioning-based scheme has lower location estimation performance than that of the GPS-based scheme, but has an advantage in that it can be used in almost all environments. In the terrestrial-positioning-based scheme, the location of the UE is estimated mainly using a synchronization signal or a reference signal. The terrestrial-positioning-based scheme is defined as the following term for each standard. The terrestrial-positioning-based scheme is defined as an Observed Time Difference Of Arrival (OTDOA) in a UMTS Terrestrial Radio Access Network (UTRAN), is defined as an Enhanced Observed Time Difference (E-OTD) in a GSM/EDGE Radio Access Network (GERAN), and is defined as an Advanced Forward Link Trilateration (AFLT) in CDMA2000.

Figure 5:
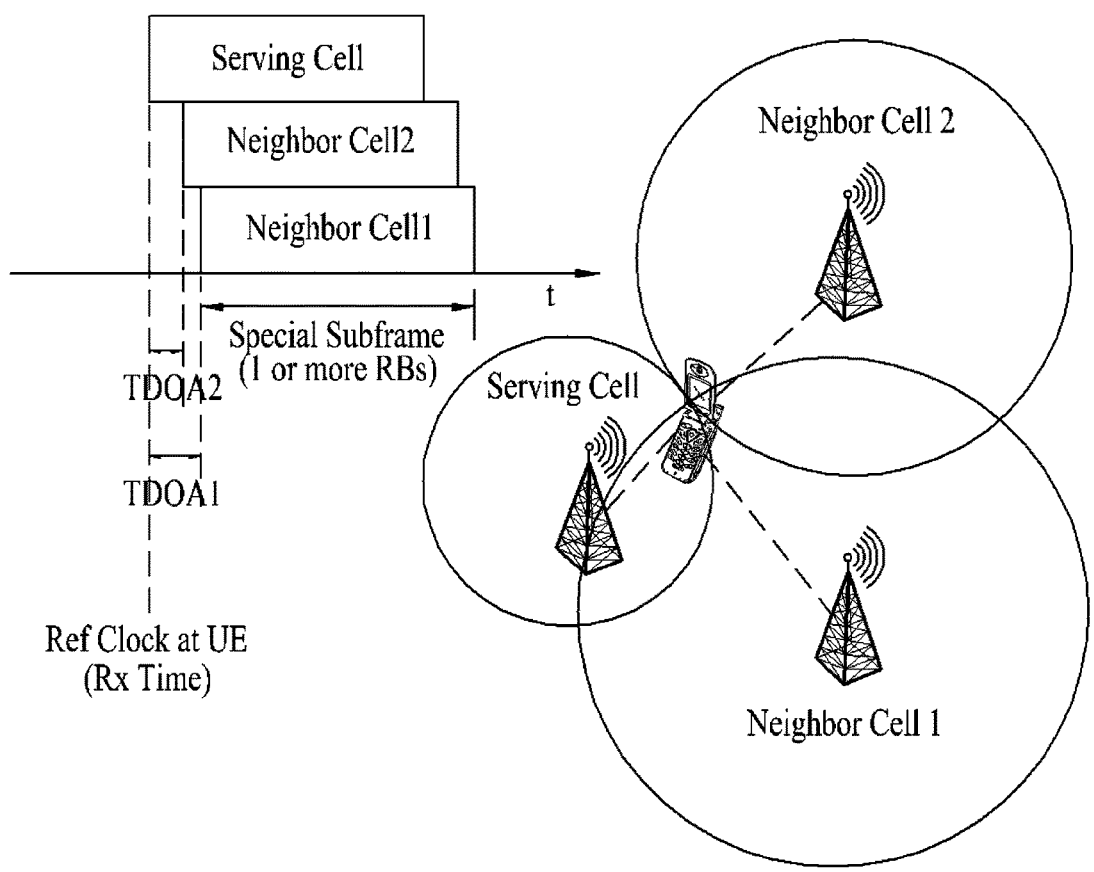
FIG. 5 illustrates an example of downlink OTDOA.

FIG. 5 illustrates an example of downlink OTDOA which is one type of the terrestrial-positioning-based scheme used in the 3GPP standard. As illustrated in FIG. 5, the UE performs a reference clock based on a subframe transmitted by current serving cell, and thus signals received from neighboring cells have different TDOAs.

The method of determining the location of the user device may be performed through a Common Reference Signal (CRS) or synchronization signals (Primary Synchronization Signal (PSS)/Secondary Synchronization Signal (SSS)), or a Positioning Reference Signal (PRS) dedicated for a LCS (LoCation Service) may be defined and used. When the UE calculates the difference between the time spent receiving a signal from a single reference BS and the time spent receiving a signal from each of a plurality of neighboring BSs using reference signals or synchronization signals received from the single reference BS and the plurality of neighboring BSs and transmits the time difference to an Enhanced Serving Mobile Location Center (E-SMLC), the E-SMLC may calculate the location of the UE by solving a linearized equation using Taylor series expansion.

For such an OTDOA scheme, it is important to avoid interference between PRS patterns used for measuring the location. That is, it is required to transmit PRSs transmitted by at least three cells used for measuring the location through different PRS patterns. However, when PRS patterns are configured using limited cell IDs (PCIDs) in an environment in which BSs, such as small cells, or cells are closely disposed, an interference phenomenon may increase due to the redundancy of PRS patterns.

First, the Positioning Reference Signal (PRS) will be described.

The PRS corresponds to a reference signal used for determining the location of the UE and is transmitted only through resource blocks of a downlink subframe determined for PRS transmission.

A PRS sequence is defined by Equation (1).

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

Here, $r_{l,n_s}(m)$ denotes a PRS sequence, $n_s$ denotes a slot number within a frame, and l denotes an OFDM symbol number within a slot. c(i) denotes a pseudo-random sequence and a pseudo-random sequence generator is initialized as $c_{init}$ as shown in equation (2) at a starting point of each OFDM symbol.

$$c_{init} = 2^{10} \cdot (7 \cdot (n_s+1) + l + 1) \cdot (2 \cdot N_{ID}^{cell} + 1) + 2 \cdot N_{ID}^{cell} + N_{CP} \quad \text{[Equation 2]}$$

Here, $N_{ID}^{cell}$ denotes a physical layer cell ID, and $N_{ID}^{cell}$ is 1 when an OFDM symbol has a normal Cyclic Prefix (CP) and is 0 when the OFDM symbol has an extended CP.

Figure 6:
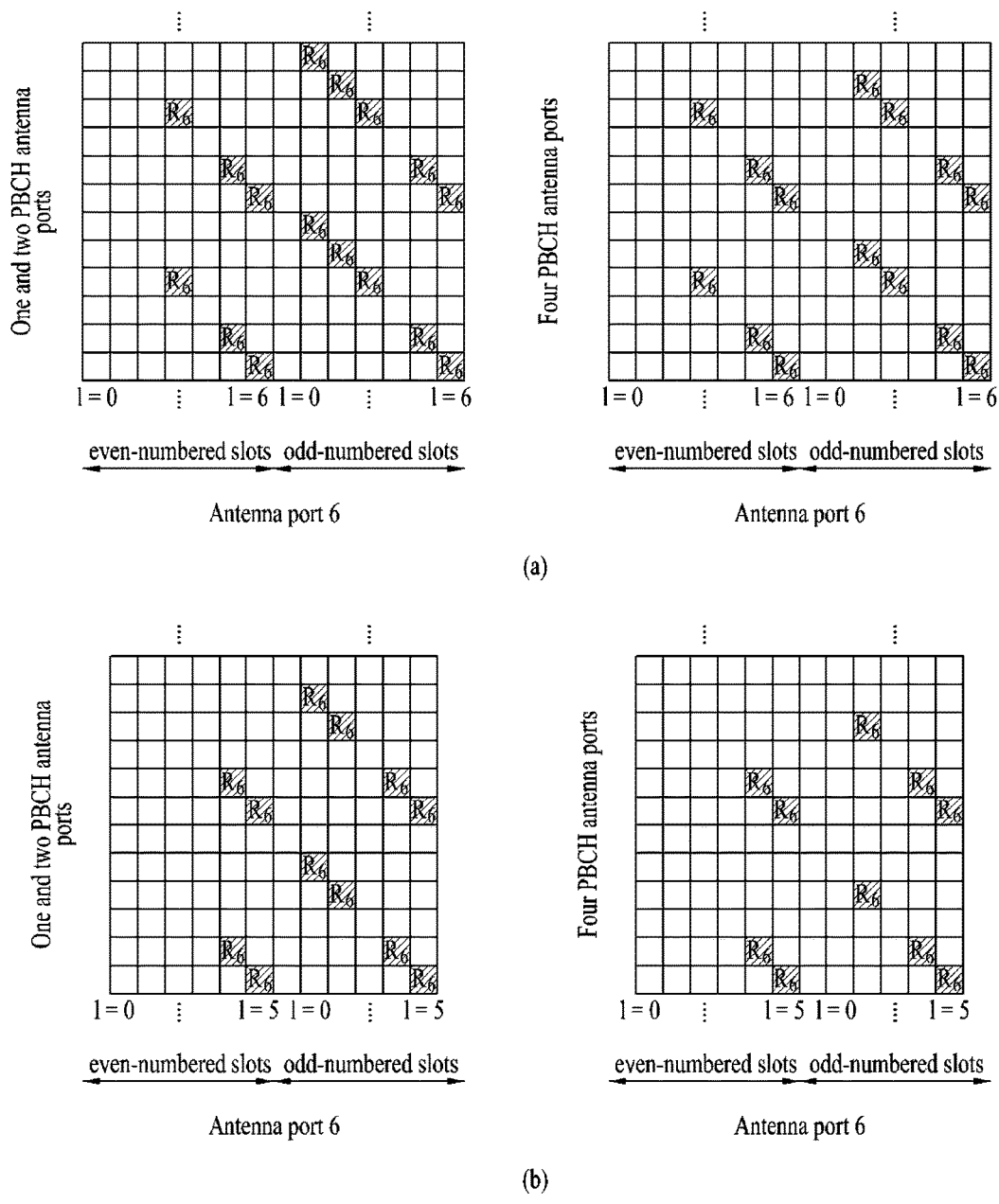
FIG. 6 illustrates an example of patterns in which PRSs are allocated to resource elements.

FIG. 6 illustrates an example of patterns in which PRSs are allocated to resource elements. FIG. 6A illustrates the case of the normal CP, and FIG. 6B illustrates the case of the extended CP. As illustrated in FIG. 6, the PRS patterns are mapped to some REs in two slots and transmitted. Further, the PRS patterns are operated with a frequency reuse rate of 6. To this end, the PRSs may be transmitted using patterns determined by cell IDs (PCIDs) for transmitting the PRSs based on six patterns. As necessary, the PRSs may be differently configured according to an antenna port or a CP type.

In the environment in which a plurality of small cells is disposed, as in the above-described situation, the PRSs may be transmitted in the same PRS pattern due to an increase in cell IDs or an increase in cells using the same cell ID. In this case, since a hit may be generated between PRS patterns, the UE may not accurately receive the PRSs even though each cell increases PRS transmission power.

For example, in the conventional art, the PRS pattern to be used by each cell may be configured by determining six PRS patterns through a modular function using the physical cell ID (PCID) of each cell. However, when two adjacent cells have the same PCID, PRS patterns may be redundant. Specifically, when a macro cell and a small cell that transmit PRSs to one UE have a cell ID no. 0 and a cell ID no. 6, both the macro cell and the small cell have 0 by a mod(PCI,6) function (here, a PCI is a cell ID) and the PRS pattern is determined through a PRS sequence corresponding to 0. Also, when the same cell ID is allocated to the macro cell and the small cell, the same problem may occur.

Accordingly, even though there are 6 different PRS patterns through hopping in a frequency domain, signals having the same PRS pattern may be transmitted to one UE. In this specification, the term "PRS pattern" refers to a pattern in which PRSs are allocated to REs by the PRS sequence, and may be used as a meaning which is the same as the PRS sequence as necessary.

Hereinafter, various embodiments for minimizing mutual interference between PRSs received by the UE will be described.

In the conventional art, PRSs are transmitted through one or more subframes included in a PRS monitoring section (for example, PRS occasion), and all PRSs transmitted in one PRS monitoring section are mapped and transmitted by the same resource element allocation pattern. Further, the resource element allocation pattern is determined through a function by a cell ID (PCID) of each cell for transmitting the PRSs. Such a PRS transmission method generates an interference phenomenon due to PCID redundancy and a PRS transmission distance in the situation of dense cells.

Accordingly, the present embodiments described below propose a method of configuring a resource element allocation pattern for PRS transmission and a method of differently configuring a resource element allocation pattern transmitted in one PRS monitoring section. Hereinafter, each embodiment will be described with reference to drawings. Each embodiment may be independently applied, or a combination thereof may be applied.

Figure 7:
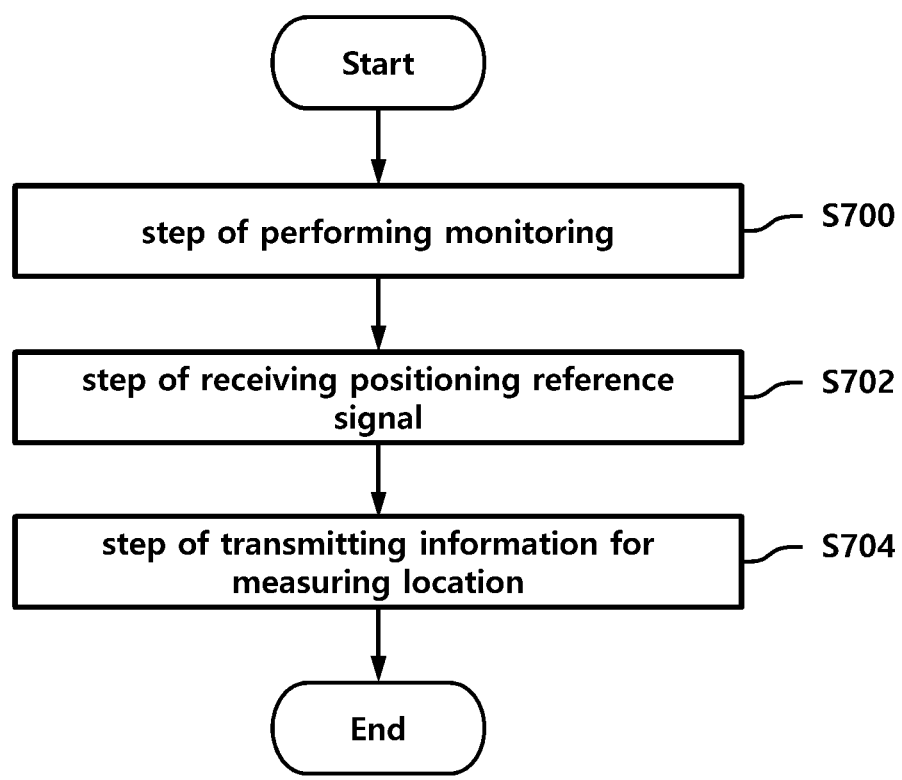
FIG. 7 illustrates the UE operation according to an embodiment.

FIG. 7 illustrates the UE operation according to an embodiment.

Referring to FIG. 7, the UE may perform a step of monitoring a reference signal in one positioning reference signal monitoring section in S700. The UE may monitor reception of the positioning reference signal in at least one subframe in a preset positioning reference signal monitoring section (PRS occasion). In one PRS monitoring section, the positioning reference signal may be transmitted through one or more successive subframes. The PRS monitoring section and information on the subframe in which the positioning reference signal is transmitted may be explicitly or implicitly indicated through the BS. For example, the PRS monitoring section may be determined by a combination of preset section length information and start subframe or start frame information indicated by the BS. Further, the information on the subframe in which the positioning reference signal is transmitted may be indicated by the BS. In another example, both the PRS monitoring section and the subframe information may be dynamically allocated by the BS. In addition, the UE may identify the PRS monitoring section and the information on the subframe in which the positioning reference signal is transmitted through any of various methods. Alternatively, the UE may monitor whether the positioning reference signals are transmitted in all subframes of the PRS monitoring section.

Further, the UE may perform a step of receiving the positioning reference signals in one or more successive subframes included in the one positioning reference signal monitoring section. Here, a resource element allocation pattern of the positioning reference signal may be determined using a random number in S702. The UE may receive positioning reference signals transmitted in each subframe. As described above, the positioning reference signals may be allocated to resource elements by the PRS sequence. A resource element allocation pattern of the positioning reference signals may be determined to be one of the 6 types by an offset value. The offset value may be determined by a random number, and the random number may be determined to be one of integers from 0 to 5. That is, the offset value is determined by a cell ID of each cell, and the PRS pattern is determined using the offset value in the conventional art, but the PRS pattern is determined by a random number in the present embodiment.

Meanwhile, the random number may be determined by an output value of a random number generator of each cell for transmitting the positioning reference signal, and the random number generator may be initiated by a cell ID of each cell. That is, the random number may be determined by each BS or each cell, and the initialization of the random number generator may be determined by a cell ID of each cell. Each UE may acquire the cell ID of each cell using a synchronization signal, and may thus identify random number generator initialization information of each cell. Accordingly, even when each cell determines the resource element allocation pattern through the random number, the UE may recognize the corresponding resource element allocation pattern.

Therefore, even though PRSs are transmitted from a plurality of cells having the same cell ID, the UE receives the PRSs in the resource element allocation pattern randomly determined by the random number, thereby reducing the possibility of mutual interference between PRSs.

Further, the UE may perform a step of transmitting, to the BS, information for measuring the location based on reception time information of the positioning reference signal in S704. The UE may transmit information, which the BS uses to measure the location of the UE, based on the reception time information of the positioning reference signal received through the above method. For example, the UE may transmit, to the BS, reception time information or reception time difference information of the PRSs received in each cell. Alternatively, the UE may directly measure location information of the UE through the PRSs.

Meanwhile, the UE may further receive positioning reference signal assistance information. The positioning reference signal assistance information may include cell ID information of each cell or random number generator information. The UE may receive the positioning reference signal assistance information by higher-layer signaling or a signal received through the BS. The positioning reference signal assistance information may include cell ID information of each cell or random number generator information used by each cell. The UE may identify and monitor the resource element allocation pattern of the positioning reference signal in advance by identifying the random number information generated in each cell.

Meanwhile, since the positioning reference signal according to the resource element allocation pattern using the random number has a PRS pattern different from that of the positioning reference signal according to the resource element allocation pattern using the cell ID, a legacy UE may not receive the corresponding positioning reference signal. Accordingly, it is required to configure the resource element allocation pattern of the positioning reference signal in consideration of the legacy UE.

Figure 8:
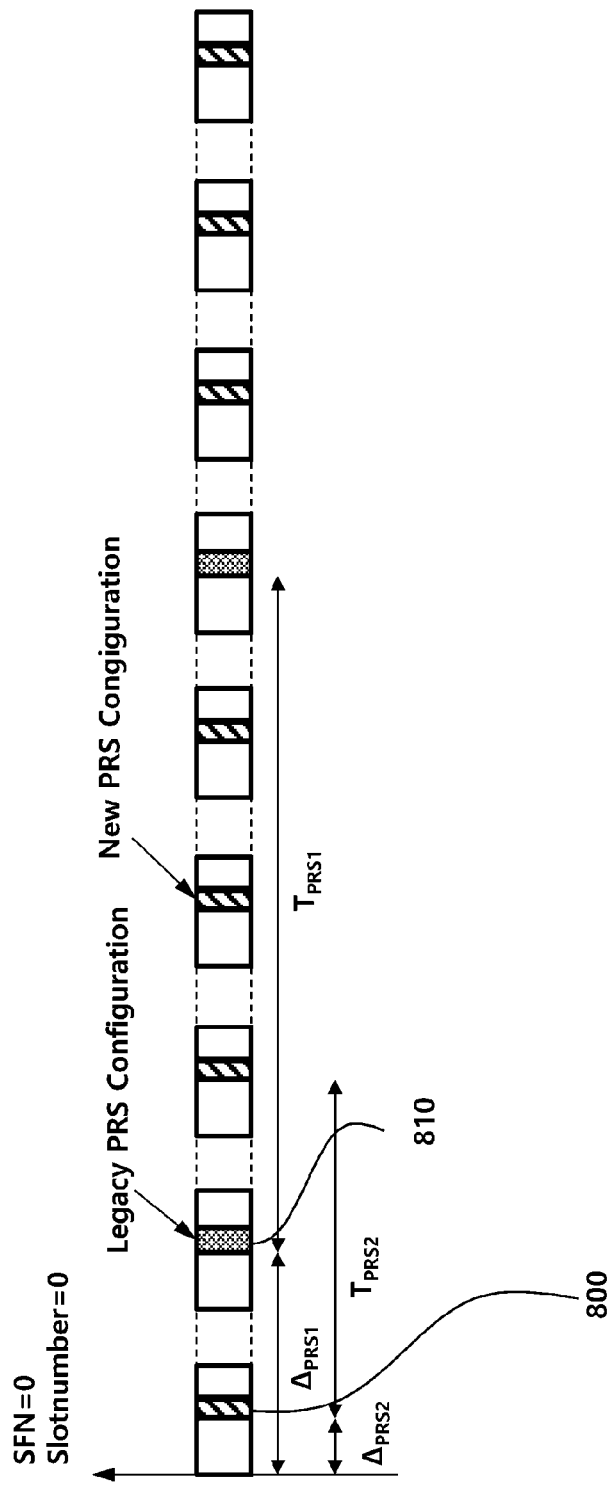
FIG. 8 illustrates a positioning reference signal period according to a resource element allocation pattern according to an embodiment.

FIG. 8 illustrates a positioning reference signal period according to a resource element allocation pattern according to an embodiment.

In order to consider the legacy UE, the period of the positioning reference signal transmitted in the resource element allocation pattern determined by the random number may be configured to be different from the period of the positioning reference signal transmitted in the resource element allocation pattern determined by the cell ID.

Referring to FIG. 8, a PRS 810 for the legacy UE is configured on a period of TPRS1 and transmitted through a subframe (or slot) according to the corresponding period. Unlike this, a PRS 800 having the resource element allocation pattern determined using the random number may be configured and transmitted according to a period of TPRS2 different from that of the PRS 810 for the legacy UE. Accordingly, each UE may receive the PRS based on PRS configuration capability supported by the UE.

Alternatively, the BS may differently configure a starting point, at which the PRS transmission starts, according to the capability of each UE. For example, the PRS for the legacy UE has a starting point configured using a gap of ΔPRS1, and the terminal for determining the resource element allocation pattern using the random number may configure a starting point using a gap of ΔPRS2. The starting point is determined by a gap configured based on slot number 0 of System Frame Number (SFN) 0. That is, the legacy UE may determine the starting point based on the gap of ΔPRS1, and the UE using the random number may determine the starting point based on the gap of ΔPRS2.

Alternatively, the PRS period and the gap of the starting point may all be applied.

Accordingly, the BS may support the UE to which the present embodiment is applied as well as a legacy UE.

The above description is related to an embodiment of minimizing PRS interference by determining the resource element allocation pattern of the PRS using a random number. Unlike this, or in another embodiment which can be applied therewith, PRSs may be transmitted and received through the application of different resource element allocation patterns in one PRS monitoring section.

Hereinafter, a method of configuring the resource element allocation pattern for each subframe separately or which can be applied together with the embodiment of determining the resource element allocation pattern based on the random number will be described.

As described above, the PRSs may be received through two or more successive subframes in one PRS monitoring section. In this case, a cell-specific PRS resource element allocation pattern is equally applied in the conventional art. However, the PRS resource element allocation pattern according to the present embodiment may be differently applied in each subframe.

Figure 9:
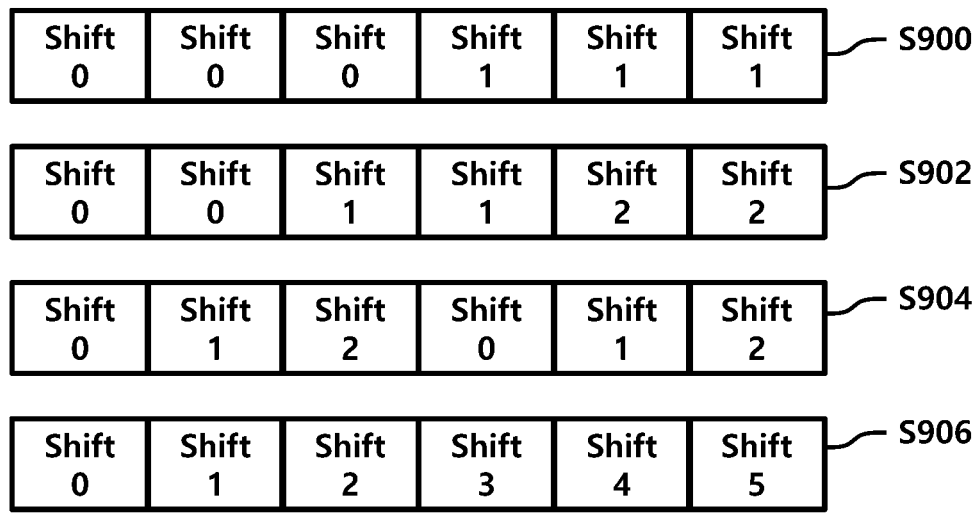
FIG. 9 illustrates an embodiment of applying the resource element allocation pattern to each subframe when the positioning reference signals are transmitted in 6 subframes.

FIG. 9 illustrates an embodiment of applying the resource element allocation pattern to each subframe when the positioning reference signals are transmitted in 6 subframes.

In one PRS monitoring section, PRSs may be transmitted through a plurality of successive subframes. For example, the PRSs may be transmitted through 2, 4, or 6 successive subframes. In this case, according to the present embodiment, two or more resource element allocation patterns may be used when the PRSs are transmitted in two or more successive subframes in one PRS monitoring section. For convenience of description, it is assumed that the PRSs are transmitted through 6 successive subframes in one PRS monitoring section, but the description may be equally applied to the case of two or more subframes.

Referring to FIG. 9, shift N expresses each resource element allocation pattern through a number. That is, shift 1 and shift 0 mean different resource element allocation patterns.

For example, the PRSs may be transmitted using shift 0 and shift 1 in 6 successive subframes in S900. That is, the same resource element allocation pattern of shift 0 using the same random number or cell ID may be applied to the first 3 subframes and the resource element allocation pattern of shift 1 may be applied to subsequent 3 subframes. In another example, each of the 3 PRS resource element allocation patterns (shift 0, shift 1, and shift 2) may be transmitted in two subframes in S902. In another example, each of the 3 PRS resource element allocation patterns (shift 0, shift 1, and shift 2) may be transmitted in two subframes, but the transmission order thereof is repeated in S904. In another example, 6 PRS resource element allocation patterns (Shift 0, Shift 1, Shift 2, Shift 3, Shift 4, and Shift 5) may be applied to respective subframes according to the order of the subframe in S906. FIG. 9 only illustrates an example, and resource element allocation patterns based on various combinations may be applied to successive subframes. Further, the resource element allocation pattern determined using the random number or the cell ID (conventional method) may be applied to a start subframe of the successive subframes, after which separate resource element allocation patterns may be applied for respective cells or dynamically.

As described above, it is possible to prevent PRS interference by differently applying the resource element allocation patterns to respective subframes of the successive subframes. The resource element allocation pattern applied to each subframe may be determined by the number of successive subframes.

Alternatively, the UE may separately receive information on the resource element allocation patterns applied to the successive subframes from each cell or each BS. To this end, the UE may receive the resource element allocation patterns for each cell through higher-layer signaling.

As described above, when two or more resource element allocation patterns are allocated to one PRS monitoring section, all or some of the resource element allocation patterns may be determined based on a random number.

As described above, by applying a combination of the present embodiments or individually applying the present embodiments, the problem due to PRS interference can be solved even in the situation in which small cells are disposed in increasing density. Further, it is possible to measure the accurate location of the UE, thereby providing accurate UE location information in an indoor environment.

Figure 10:
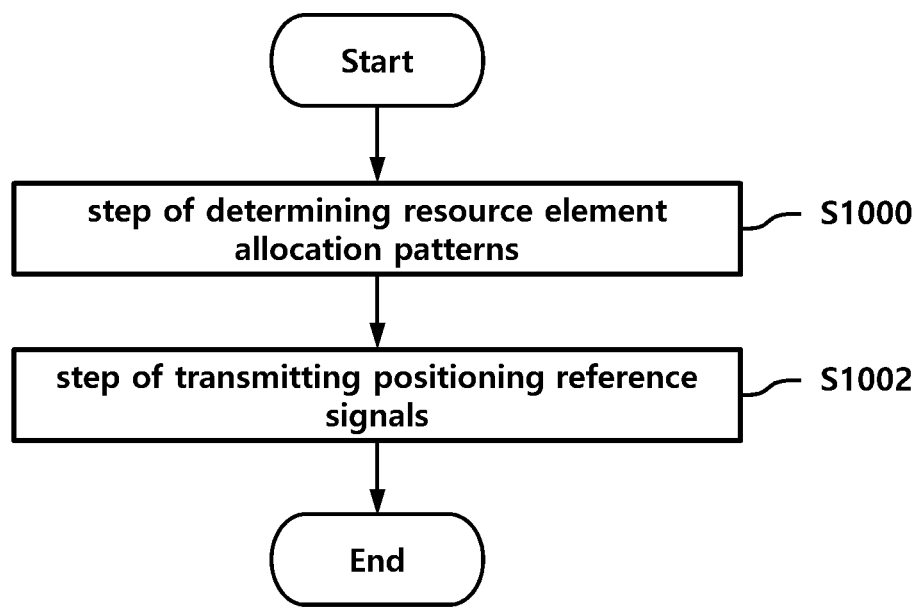
FIG. 10 illustrates the BS operation according to an embodiment.

The operation of the BS for implementing the above-described present embodiments will be described with reference to FIG. 10. FIG. 10 illustrates the BS operation according to an embodiment.

Referring to FIG. 10, the BS according to an embodiment may perform a step of determining a resource element allocation pattern of the positioning reference signal using a random number in S1000. The BS may determine the resource element allocation pattern of the PRS using an output value of the random number generator. As described above, the resource element allocation pattern of the positioning reference signal may be set to include 6 types based on an offset value, and the offset value may be determined using a random number determined from integers 0 to 5. Accordingly, even in the case of cells having the same cell ID, different resource element allocation patterns may be determined based on the random number.

The BS may differently determine the resource element allocation pattern to be applied to each of the successive subframes. As illustrated in FIG. 9, the resource element allocation pattern applied to each subframe may be determined by the number of successive subframes.

Further, the BS may perform a step of transmitting positioning reference signals using resource element allocation patterns in one or more successive subframes included in one positioning reference signal monitoring section in S1002. The BS may transmit the resource element allocation patterns determined by the above method to the UE through one or more successive subframes included within one PRS monitoring section. In this case, for resources of the legacy UE, the BS may differently set gaps for transmission periods or starting points of the PRS conventionally determined by the cell ID and the PRS determined by the random number and transmit the PRS with the differently set gaps. Alternatively, when PRSs are transmitted through a plurality of successive subframes, the BS may differently configure the resource element allocation pattern applied to each subframe based on two or more resource element allocation patterns and transmit the PRSs in the differently configured resource element allocation patterns. This is the same as the description made with reference to FIG. 9.

Further, the BS may transmit the cell ID or random number generation information to the UE and transmit pattern information of the resource element allocation pattern applied to each subframe to the UE.

All of the operations in the present embodiments described with reference to FIGS. 1 to 10 can be performed. A UE apparatus and a BS apparatus will be briefly described with reference to the drawings.

Figure 11:
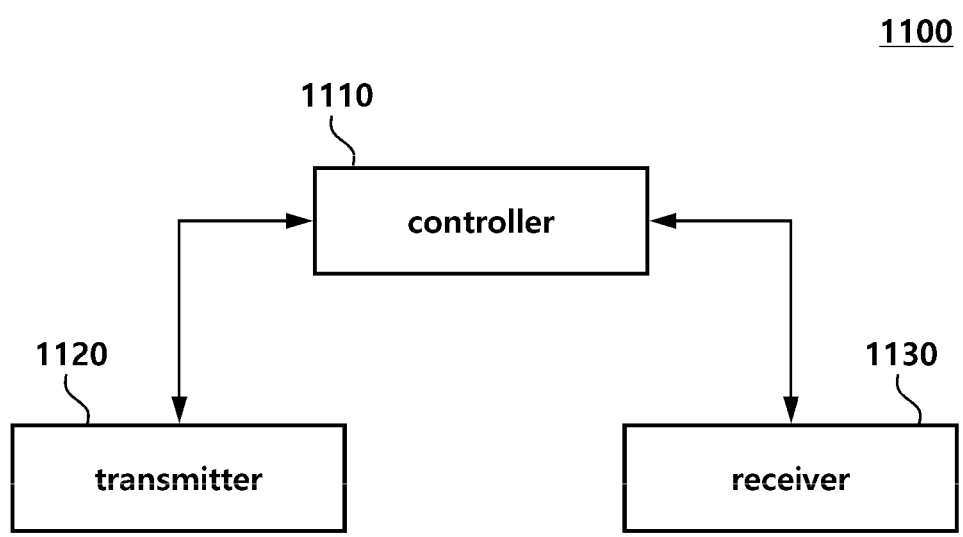
FIG. 11 illustrates the configuration of the UE according to an embodiment.

FIG. 11 illustrates the configuration of a UE according to an embodiment.

Referring to FIG. 11, a UE 1100 for receiving positioning reference signals may include a controller 1110 for monitoring positioning reference signals in one positioning reference signal monitoring section, a receiver 1130 for receiving positioning reference signals in one or more successive subframes included in the one positioning reference signal monitoring section, and a transmitter 1120 for transmitting information for measuring a location to the BS based on reception time information of the positioning reference signals. Further, a resource element allocation pattern of the positioning reference signal may be determined using a random number.

In addition, the resource element allocation pattern of the positioning reference signal may be determined to be one of the 6 types by a value output from a random number generator of the BS. The random number may be determined as one of 6 integers from 0 to 5.

The receiver 1130 may further receive positioning reference signal assistance information, and the reference signal assistance information may include at least one piece of cell ID information of each cell and random number generator information. Further, the receiver 1130 may further include information on the resource element allocation pattern allocated to each of the successive subframes. As described above, when the PRSs are received in two or more successive subframes, various combinations of two or more resource element allocation patterns may be applied to respective subframes. The receiver 1130 may receive information related to various combinations determined using the number of subframes. Alternatively, the receiver 1130 may receive information on the number of successive subframes and implicitly acquire information on various combinations. In addition, the receiver 1130 may receive, from the BS, downlink control information, downlink data, and a message through a corresponding channel.

Further, the controller 1110 may control reception of PRSs configured according to different periods or starting point gaps based on information (for example, cell ID information or random number information) used for determining the resource element allocation pattern. In addition, the controller 1110 controls the overall operation of the UE 1100 according to the reception of PRSs based on the random number required for implementing the present embodiments.

The transmitter 1120 transmits, to the BS, uplink control information, uplink data, and a message through a corresponding channel.

Figure 12:
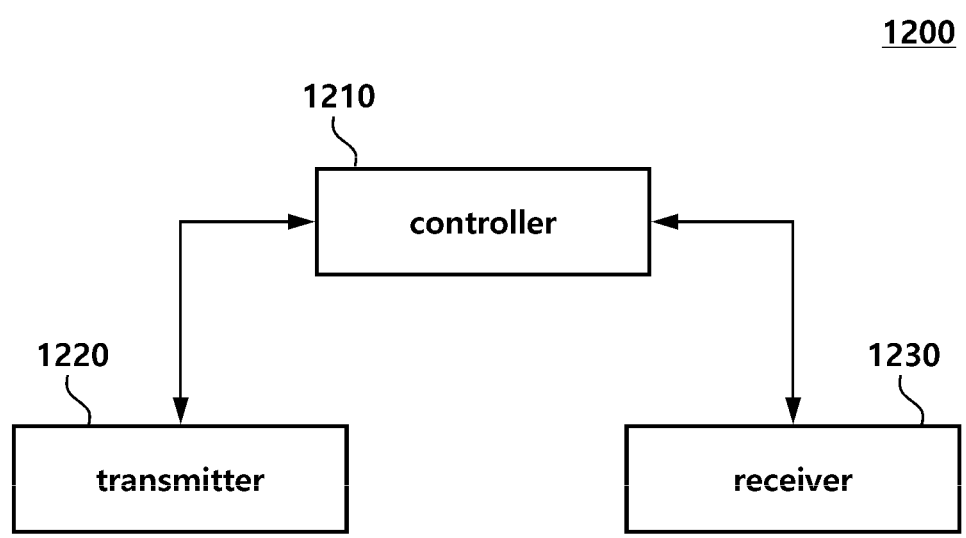
FIG. 12 illustrates the configuration of the BS according to an embodiment.

FIG. 12 illustrates the BS configuration according to an embodiment.

Referring to FIG. 12, a BS 1200 may include a controller 1210 for determining resource element allocation patterns of positioning reference signals using a random number and a transmitter 1220 for transmitting positioning reference signals through the resource element allocation pattern in one or more successive subframes included in one positioning reference signal monitoring section.

The controller 1210 may determine each PRS resource element allocation pattern using the random number, and when PRSs are transmitted through a plurality of successive subframes, distribute and allocate two or more resource element allocation patterns to the respective subframes.

The transmitter 1220 may transmit positioning reference signal assistance information to the UE, and the positioning reference signal assistance information may include cell ID information or random number generator information. Further, when PRSs are transmitted through two or more successive subframes, the transmitter 1120 may transmit, to the UE, information on two or more resource element allocation patterns allocated to individual subframes.

The receiver 1230 may receive, from the UE, reception time difference information or reception time information of the positioning reference signals used for measuring the location of the UE. In addition, the transmitter 1220 and the receiver 1230 may be used for transmitting and receiving a signal, a message, or data required for implementing the present disclosure to and from the UE.

Meanwhile, the controller 1210 controls the overall operation of the BS 1200 according to reception of the PRSs based on the random number required for implementing the above-described present embodiments.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

If applicable, this application claims priority under 35 U.S.C § 119(a) of Patent Application No. 10-2015-0139782, filed on Oct. 5, 2015, and Patent Application No. 10-2016-0128479, filed on Oct. 5, 2016 in Korea, the entire contents of which are incorporated herein by reference. In addition, this non-provisional application claims priorities in countries other than the U.S. for the same reason based on the Korean Patent Applications, the entire contents of which are hereby incorporated by reference.

The invention claimed is:

1. A method of receiving a positioning reference signal by a User Equipment (UE), the method comprising:
monitoring a positioning reference signal monitoring section;
receiving a positioning reference signal in one or more successive subframes included in the positioning reference signal monitoring section; and
transmitting information for measuring a location based on reception time information of the positioning reference signal to a Base Station (BS),
wherein a resource element allocation pattern of the positioning reference signal is determined using a random number,
wherein the resource element allocation pattern is selected from among six different resource element allocation patterns which have integer offset values 0 to 5, respectively, by randomly selecting one of the integer offset values.

2. The method of claim 1, wherein the random number is determined using an output value of a random number generator of each cell transmitting the positioning reference signal, and the random number generator is initialized by a cell ID of each cell.

3. The method of claim 2, further comprising receiving positioning reference signal assistance information, wherein the positioning reference signal assistance information contains cell ID information of each cell or information about the random number generator.

4. The method of claim 1, wherein a period of the positioning reference signal is differently set from a period of a positioning reference signal transmitted with a resource element allocation pattern determined based on a cell ID of each cell.

5. The method of claim 1, wherein, when the positioning reference signal is transmitted by a plurality of successive subframes in the positioning reference signal monitoring section, at least two of the plurality of successive subframes have different resource element allocation patterns.

6. The method of claim 5, wherein the resource element allocation patterns are determined based on a number of the plurality of successive subframes.

7. The method of claim 5, further comprising receiving information on the resource element allocation patterns.

8. A method of transmitting a positioning reference signal by a Base Station (BS), the method comprising:
determining a resource element allocation pattern of a positioning reference signal using a random number; and
transmitting the positioning reference signal using the resource element allocation pattern in one or more successive subframes included in a positioning reference signal monitoring section,
wherein the determining the resource element allocation pattern comprises selecting one of six different resource element allocation patterns which have integer offset values 0 to 5, respectively, by randomly selecting one of the integer offset values.

9. The method of claim 8, wherein a period of the positioning reference signal is differently set from a period of a positioning reference signal transmitted with a resource element allocation pattern determined based on a cell ID of each cell.

10. The method of claim 8, wherein, when the positioning reference signal is transmitted by a plurality of successive subframes in the positioning reference signal monitoring section, at least two of the plurality of successive subframes have different resource element allocation patterns.

11. The method of claim 10, wherein the resource element allocation patterns are determined based on a number of the plurality of successive subframes.

12. A User Equipment (UE) for receiving a positioning reference signal, the UE comprising:
a controller configured to monitor a positioning reference signal monitoring section;
a receiver configured to receive a positioning reference signal in one or more successive subframes included in the positioning reference signal monitoring section; and
a transmitter configured to transmit information for measuring a location based on reception time information of the positioning reference signal to a Base Station (BS),
wherein a resource element allocation pattern of the positioning reference signal is determined using a random number,
wherein the resource element allocation pattern is selected from among six different resource element allocation patterns which have integer offset values 0 to 5, respectively, by randomly selecting one of the integer offset values.

* * * * *